J. H. EASTMAN,

Assignor, by mesne assignments, to G. FROST & Co.

Clasp.

No. 9,194. Reissued May 11, 1880.

Witnesses.

Alex. Scott

Geo. R. Buffum

Inventor.

Joseph H. Eastman by Crosby & Gregory Attys.

N. PETERS, PHOTO-LITHOGRAPHER, WASHINGTON, D. C.

UNITED STATES PATENT OFFICE.

JOSEPH H. EASTMAN, OF BOSTON, ASSIGNOR, BY MESNE ASSIGNMENTS, TO GEORGE FROST & CO., OF NEWTON, MASSACHUSETTS.

CLASP.

SPECIFICATION forming part of Reissued Letters Patent No. 9,194, dated May 11, 1880.

Original No. 145,097, dated December 2, 1873. Application for reissue filed April 5, 1880.

*To all whom it may concern:*

Be it known that I, JOSEPH H. EASTMAN, of Boston, in the county of Suffolk and State of Massachusetts, have invented a new and useful Improvement in Clasps; and I hereby declare that the following is a full, clear, and exact description of the same, reference being had to the accompanying drawings, forming a part of this specification, in which—

Figure 1:
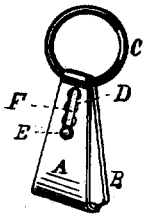
Figure 2:
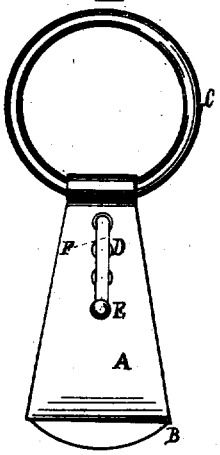
Figure 3:
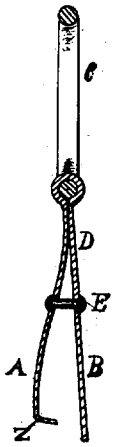

Figure 1 is a perspective view of my improved clasp. Fig. 2 is a front view of the same enlarged. Fig. 3 is a transverse sectional view, showing the double-headed pin or slide.

Like letters refer to like parts in the different figures of the drawings.

The object of my invention is to furnish a neat, cheap, and effective portable clasp which can be used for a great variety of purposes, such as hanging or supporting towels or articles of like nature without injury to the fabric, for desk use in filing letters and papers temporarily, for hanging up hats, caps, and small parcels in the cars, attaching tags to clothing, rolls of cloth, and other goods, and also in the construction of stocking-supporters and suspenders.

In Fig. 1, A B is a piece of sheet metal bent as shown in Fig. 3, to form the jaws of the clasp, the upper jaw, A, being turned or bent downwardly into a lip, the lower jaw being straight and extending somewhat beyond the upper jaw.

C is a metal ring disposed in the hinge of the clasp, and used for supporting or hanging up the same whenever required.

Through the jaws A B there are corresponding longitudinal slots F, in which is arranged a double-headed pin or slide, E. At each end of these slots, and at other parts of the same, as may be required, and on the outer surfaces of the jaws, are small depressions or countersinks, into which the heads of the pin or slide E fall as the pin is moved back and forth in the slot.

The body of the clasp, composed of elastic sheet metal, bent or formed as described, has a constant tendency to spring apart, so that when the slide E is at the end of the slot nearest the ring C the clasp will open to its fullest extent. If, when the clasp is thus open, the article it is desired to hold or grasp be inserted between the jaws A B and the slide E be pushed toward the end of the clasp opposite the ring C, the heads of the slide will come into contact with the jaws A B as it is moved along, and will gradually close the mouth of the clasp upon the article to be held, as will be readily understood.

The body parts of the spring-metal jaws are flexed or bent inwardly as the headed pin is moved along the slot F to press the lip *z* firmly upon the article between the jaws, and the jaws so flexed or bent, in their effort to return to their normal condition, produce such a strain against the under sides of the heads of the slide as to insure the entrance of the said heads into the depressions D as they arrive under the said heads, thus confining the said slide in place against accidental longitudinal movement in the said slots, which might permit the clasp to be accidentally opened.

I am aware that a patent was granted to S. K. Ellis, of Waltham, in the State of Massachusetts, April 8, 1873, for an improvement in the clasps of stocking-supporters, said clasp being constructed with two lips, one being plain and the other provided with teeth, and shutting past each other in closing.

The Ellis clasp above referred to has guards or raised stops struck up in the metal from which the jaws are formed, and is provided with a slide or hoop passing around the jaws on the outside of the same. One of the principal objections to this arrangement is that the top of the stocking or article to be held is liable to be pushed too far into the clasp, so that when the slide is attempted to be used the clasp is found to be choked, and the jaws of the same cannot be properly closed. This objection is entirely obviated in my invention by the use of the pin E, passing down through the jaws of the clasp, said pin, as it is moved along its slot toward the mouth of the clasp, operating to push the top of the stocking, or whatever has been inserted into the clasp to be held, back from the throat of the clasp, thus allowing the jaws to be effectually closed.

My device will not tear the article held by it, as in the Ellis clasp. I therefore lay no claim to any part of the invention described in said Letters Patent, when in itself considered; but What I do claim is—

1. The sheet-metal clasping-jaws provided with the longitudinal slots, combined with the double-headed pin adapted to be moved in the said slots to force the jaws together upon the article to be held between them.

2. The jaws A B, ring C, double-headed slide E, and countersunk slot, the whole being constructed, combined, and used substantially in the manner and for the purposes set forth.

JOSEPH C. EASTMAN.

Witnesses:
N. E. C. WHITNEY,
JOS. P. LIVERMORE.